United States Patent
Schwarze et al.

(10) Patent No.: US 8,496,203 B2
(45) Date of Patent: Jul. 30, 2013

(54) AIRCRAFT WITH VERTICAL STABILIZERS ARRANGED ON A CENTRAL FUSELAGE BODY AND METHOD, AS WELL AS CONTROL UNIT, FOR COMPENSATING A NEGATIVE PITCHING MOMENT

(75) Inventors: Malte Schwarze, Hamm (DE); Andreas Westenberger, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 294 days.

(21) Appl. No.: 12/913,463

(22) Filed: Oct. 27, 2010

(65) Prior Publication Data
US 2011/0095136 A1 Apr. 28, 2011

Related U.S. Application Data

(60) Provisional application No. 61/255,392, filed on Oct. 27, 2009.

(30) Foreign Application Priority Data

Oct. 27, 2009 (DE) .......................... 10 2009 050 748

(51) Int. Cl.
*B64C 9/00* (2006.01)
(52) U.S. Cl.
USPC ............................................ 244/87; 244/215
(58) Field of Classification Search
USPC ................................................... 244/87, 215
See application file for complete search history.

(56) References Cited

U.S. PATENT DOCUMENTS

| | | | | |
|---|---|---|---|---|
| 2,303,695 A | * | 12/1942 | Johnson | 244/233 |
| 2,643,833 A | * | 6/1953 | Ambroise | 244/226 |
| 3,247,821 A | * | 4/1966 | Graig | 114/283 |
| 4,003,533 A | * | 1/1977 | Carter et al. | 244/217 |
| 5,509,623 A | * | 4/1996 | Schmittle | 244/48 |
| 5,655,737 A | * | 8/1997 | Williams et al. | 244/212 |

(Continued)

FOREIGN PATENT DOCUMENTS

GB 813568 A 5/1959

OTHER PUBLICATIONS

M. Laban, M.H. Smaili, D.R. van der Heul, P. Arendsen, B.A.T. Noordman, Optimising High-Efficiency Rudders for Transport Aircraft Fuel Burn Reduction, Sep. 14-19, 2008, National Aerospace Laboratory NLR, Amsterdam, the Netherlands.p. No. 1.*

(Continued)

*Primary Examiner* — Christopher P Ellis
*Assistant Examiner* — Medhat Badawi
(74) *Attorney, Agent, or Firm* — Ingrassia Fisher & Lorenz P.C.

(57) ABSTRACT

An aircraft includes, but is not limited to a central fuselage body without horizontal stabilizer, at least one high-lift control surface, at least one vertical stabilizer that is arranged on the central fuselage body and at least one extendable compensation control surface. The compensation control surface may be moved independently of the high-lift control surface of the aircraft and generates a positive tail-heavy pitching moment when it is moved into the flow against the aircraft. Due to this measure, a negative pitching moment during the actuation of high-lift control surfaces may be at least partially eliminated without influencing the high lift. Rudder segments that may be moved opposite to one another on two vertical stabilizers that are arranged mirror-symmetrical referred to the longitudinal axis of the aircraft preferably are used for this purpose.

18 Claims, 3 Drawing Sheets

U.S. PATENT DOCUMENTS

| | | | |
|---|---|---|---|
| 6,193,187 B1 * | 2/2001 | Scott et al. | 244/2 |
| 2004/0016845 A1 * | 1/2004 | Nelson | 244/45 A |
| 2007/0023571 A1 * | 2/2007 | Kawai et al. | 244/119 |
| 2009/0173830 A1 * | 7/2009 | Cormier | 244/159.3 |
| 2010/0096497 A1 * | 4/2010 | Macgregor | 244/87 |
| 2011/0095128 A1 * | 4/2011 | Schwarze et al. | 244/87 |
| 2011/0174921 A1 * | 7/2011 | Fervel et al. | 244/87 |
| 2011/0266081 A1 * | 11/2011 | Novikov-Kopp | 180/120 |
| 2012/0145834 A1 * | 6/2012 | Morgan et al. | 244/90 R |

OTHER PUBLICATIONS

"Verticle Stabilizer" http://en.wikipedia.org/wiki/Vertical_stabilizer; downloaded Nov. 12, 2010.

National Aeronautics and Space Administration, "Student Reading: Aeronautics of the Space Shuttle," Aug. 12, 1977; http://questa.nasa.gov/space/frontiers/activities/desk/handouts/pdf/aero.pdf.

German Patent Office, German Office Action dated May 7, 2013 for German Patent Application No. 102009050748.5.

* cited by examiner

AIRCRAFT WITH VERTICAL STABILIZERS ARRANGED ON A CENTRAL FUSELAGE BODY AND METHOD, AS WELL AS CONTROL UNIT, FOR COMPENSATING A NEGATIVE PITCHING MOMENT

CROSS-REFERENCE TO RELATED APPLICATIONS

This application claims priority to German Patent Application No. 10 2009 050 748.5, filed Oct. 27, 2009 and U.S. Provisional Application No. 61/255,392 filed Oct. 27, 2009, both of which are incorporated herein by reference in their entirety.

TECHNICAL FIELD

The technical field relates to an aircraft with vertical stabilizers arranged on a central fuselage body, to a method for compensating a negative pitching moment, and to a control unit for compensating a negative pitching moment, as well as to a use.

BACKGROUND

One known problem of aircraft with a so-called "Blended-Wing-Body" configuration, the design of which is modeled after flying wings, is that the extension of the trailing edge flaps results in an intense nose-heavy moment when a high-lift system is used. According to the state of the art, this is partially compensated with additional trailing edge flaps or with a fuselage flap (so-called "Body Flap"), namely by deflecting these flaps upward in order to generate a tail-heavy counter moment. However, the extension locally decambers the airfoil profile such that the attainable total lift of the aircraft referred to the overall configuration is reduced, and this likewise represents a reduced efficiency of the high-lift system.

The combat aircraft McDonnell-Douglas F-18 and Lockheed Martin F-22 Raptor respectively feature a double vertical stabilizer on a central fuselage body. The rudders of this double vertical stabilizer may be simultaneously deflected inward for a brief moment in order to generate a pitching moment during a brief and dynamic segment of take-off phases, and this may also reduce the required take-off runway length, particularly for take-offs from an aircraft carrier. However, both aircraft have conventional configurations, the design of which does not correspond to that of a flying wing or blended-wing-body configuration.

As an essential component of the NASA Space Shuttle, the so-called "Orbiter" is designed in the form of a flying wing configuration and features a segmented split rudder that is exclusively used for the control about a vertical axis, i.e., for a yaw control, and also as a so-called "speed brake" for controlling the angle of approach. A control of the pitching moment is realized with combined elevators and ailerons ("Elevons") and the above-described body flap only.

In the aforementioned state of the art, it is not known to equip an aircraft having a flying wing or blended-wing-body configuration with a device that is able to at least partially compensate a nose-heavy pitching moment without impairing the effect of a high-lift system, i.e., without reducing the lifting force generated by a high-lift system.

Accordingly, there may be a need for an aircraft with a central fuselage body without horizontal stabilizer and with at least one vertical stabilizer that is arranged on the fuselage body and capable of increasing the lift of the aircraft during take-off and landing phases by means of a high-lift system, as well as of simultaneously reducing a nose-heaviness caused by the blended-wing-body configuration, however, without impairing the efficiency of the high-lift system. There may furthermore be a need for a control unit that is designed for reducing the nose-heavy pitching moment of an aircraft by actuating compensation control surfaces thereof, namely without reducing the lifting force attained by means of the high-lift system. In addition, other needs, desirable features and characteristics will become apparent from the subsequent summary and detailed description, and the appended claims, taken in conjunction with the accompanying drawings and this background.

SUMMARY

According to a first embodiment of the present invention, the aircraft comprises at least one extendable compensation control surface that may be moved independently of trailing edge flaps of the aircraft and generates a positive pitching moment when it is extended into the flow against the aircraft. The independence of trailing edge flaps means that compensation control surfaces to be provided are not arranged on the trailing edge in the region of high-lift control surfaces such that the effect thereof is not impaired and the lift of the overall configuration is accordingly not reduced.

Aircraft with a blended-wing-body configuration comprise a fuselage and airfoils that are shaped such that they transform into one another in a continuous and harmonic fashion and, as a unit, collectively generate the lift required for the flight. Extensive investigations on different configurations have shown that it is indispensable to arrange additional bodies in the form of stabilizer surfaces in the flow around the aircraft despite their disadvantages in order to ensure the vertical stabilizer function. Without vertical stabilizes, there would be no sufficient directional stability in flight and, in particular, if an engine fails during take-off.

It may therefore be advantageous to arrange the at least one compensation control surface to be provided on at least one vertical stabilizer of the aircraft. In this case, the vertical stabilizer should preferably be arranged on a central fuselage body of the aircraft that, depending on the configuration of the aircraft, could either be realized in the form of a narrow and elongated fuselage or a wide, flat fuselage of an aircraft with blended-wing-body configuration.

The particular advantage of such a compensation control surface may be seen in that a sufficient lifting force may be generated with high-lift control surfaces on the trailing edge of the aircraft or other devices while the function of compensation control surfaces to be provided separately thereof is merely limited to generating an additional drag that causes a positive pitching moment when the point of application is spaced apart from the center of gravity of the aircraft in the direction of the vertical axis due to the thusly formed lever arm, wherein said positive pitching moment at least partially compensates the nose-heavy and downwardly directed negative pitching moment of the aircraft in the high-lift state. Since no additional force vector that is directed parallel to a vertical axis of the aircraft is created, the balance of forces referred to the vertical axis of the aircraft and therefore the lift remains unchanged while the balance of forces in the longitudinal direction of the aircraft is changed due to the additional drag of the compensation control surface.

In order to increase the efficiency and to reduce the required drag for generating the positive pitching moment, it is practical to space apart the compensation control surface to be provided as far as possible from the center of gravity of the aircraft along the vertical axis thereof because the required drag for generating a defined compensation moment is dependent on the lever arm at hand in an inversely proportional fashion.

In an advantageous embodiment of the aircraft according to the invention, the at least one compensation control surface is arranged on an upper side of a vertical stabilizer of the aircraft. Since the vertical stabilizer usually extends from the aircraft fuselage body at least largely parallel to a vertical axis of the aircraft, it is particularly advantageous to arrange the compensation control surface as far outward or upward as possible because the available lever arm for generating the positive pitching moment is maximized in this way. If the at least one compensation control surface is actually realized in the form of only a single compensation control surface that is not positioned centrally on a central vertical stabilizer, it is also required to deflect a rudder or another correspondent control surface in the opposite direction while this individual control surface is extended in order to realize a compensation of the yaw moment generated in parallel by the compensation control surface.

However, it may be preferred to arrange the compensation control surface symmetrically referred to a longitudinal axis of the aircraft and to also symmetrically deflect the compensation control surface. It is furthermore particularly preferred to provide two or more compensation control surfaces that are deflected mirror-symmetrical referred to the longitudinal axis of the aircraft such that these at least two compensation control surfaces generate a positive pitching moment, but no additional yaw moment. Due to this measure, no adaptation of the primary flight control is required.

It may particularly be preferred to realize the at least one compensation control surface in the form of a split rudder that may be divided in the plane of the vertical stabilizer or the plane of the compensation control surface, wherein these control surface sections may be deflected mirror-symmetrical referred to the longitudinal direction of the aircraft. Due to this measure, the central idea of the invention is also realized without additional compensation of the yaw moment if the aircraft merely comprises one individual vertical stabilizer. Consequently, it is not necessary to provide two separately actuated compensation control surfaces, wherein the integration of a split rudder simultaneously is very compact and technically perfected and furthermore has a relatively low weight.

If the aircraft comprises two or more vertical stabilizers that are arranged, for example, mirror-symmetrical along the longitudinal axis of the aircraft, it would be practical to provide two separate compensation control surfaces that may be moved independently of one another and are respectively arranged on one of the vertical stabilizers with identical geometry and identical position. In order to prevent a yaw moment during an asymmetric actuation of the compensation control surfaces, they should be designed for being moved relative to one another in opposite directions. In the simplest case, both compensation control surfaces are deflected inward or both compensation control surfaces are deflected outward.

In another embodiment of the aircraft according to the invention, this approach may be optimized in such a way that the rudders of two or more vertical stabilizers are segmented and, for example, the upper segment of the rudders is respectively deflected inward or outward such that a positive pitching moment may be produced neutral in terms of a yaw moment. In this case, the respective rudders separately form one of the compensation control surfaces.

In another embodiment of the aircraft according to the invention, at least one rudder is segmented, wherein the top segment or one of the upper segments is realized in the form of a split rudder and acts as compensation control surface. Due to this measure, the effective lever arm for the additional drag to be generated may be maximized because the attainable force per compensation surface on the upper side of the respective vertical stabilizer is increased.

In another embodiment of the aircraft according to the invention, all split rudders may be modified in such a way that each section of the split rudder is equipped with a hinge and may be folded during the deflection of the split rudder sections. In comparison with a single hinge variation, the advantage of such a double-hinge arrangement may be seen in that the surface that may be perpendicularly projected on the flow against the aircraft may be realized larger with an altogether identical rudder surface due to the different control angles. Consequently, the additional drag attainable with an identical rudder surface and therefore also the positive pitching moment generated with this arrangement would be higher. One embodiment of such a rudder in the form of a double-hinge arrangement is known from practical applications on aircraft of the type Dash 8-Q400, in which the rudder is, however, exclusively used for conventionally realizing a yaw movement and not utilized as a compensation control surface.

In another embodiment of the aircraft according to the invention, all rudder surfaces of vertical stabilizers that are arranged mirror-symmetrical to one another could be used for generating a positive and compensating pitching moment without thusly inducing a yaw moment.

Due to the aforementioned features, it is possible to modify, in particular, aircraft with a blended-wing-body configuration such that their relatively high lift/drag ratio in the landing configuration may be reduced without restricting the efficiency of the high-lift system. A high aerodynamic quality or a high lift/drag ratio of the aircraft is thereby achieved in parallel, and a conventional glide slope, for example, of 3° may be simultaneously accomplished for an approach despite this high lift/drag ratio.

The need could also be met with a control unit that is connected to at least one compensation control surface that may be deflected into the aerodynamic flow against an aircraft in order to generate a positive pitching moment. According to the above-described advantages and technical features, the control unit could be integrated into already existing aircraft that comprise, for example, rudders arranged mirror-symmetrical on a longitudinal axis of the aircraft such that the pitching moment may be increased by deflecting the rudders in opposite directions, particularly during the approach to be considered as a stationary process.

It goes without saying that a superposition of the conventional rudder movement may also take place during the generation of the positive pitching moment by means of one or more rudders, and that the yaw movement of the aircraft is still ensured with such an arrangement.

The need may furthermore be met with a method for compensating a negative pitching moment that essentially comprises the following steps. After actuating a high-lift system, at least one compensation control surface is deflected simultaneously or shortly thereafter in order to generate a positive pitching moment. In an advantageous improvement of the method according to the invention, two or more compensation control surfaces that may also be realized in the form of rudders or rudder segments are deflected opposite to one another such that a positive pitching moment is generated, but no yaw moment to be compensated.

In an embodiment of a method according to the invention, compensation control surfaces on at least an upper side of at least one vertical stabilizer are deflected, wherein at least two compensation control surfaces that are arranged mirror-symmetrical along a longitudinal axis of the aircraft and may also be realized in the form of rudders or rudder segments preferably are deflected opposite to one another. It is also preferred to deflect split rudders or upper segments of rudders of two vertical stabilizers that are arranged mirror-symmetrical along a longitudinal axis of the aircraft opposite to one another in a divided fashion. These process steps according to the invention are preferably carried out by an above-described control unit according to the invention.

BRIEF DESCRIPTION OF THE FIGURES

Other features, advantages and possible applications of the present invention result from the following description of exemplary embodiments and the figures. In this respect, all described and/or graphically illustrated features also form the object of the invention individually and in arbitrary combination regardless of their composition in the individual claims or their references to other claims. In the figures, identical or similar objects are furthermore identified by the same reference symbols.

DETAILED DESCRIPTION

The following detailed description of the invention is merely exemplary in nature and is not intended to application and uses. Furthermore, there is no intention to be bound by any theory presented in the preceding background or summary or the following detailed description.

Figure 1A:
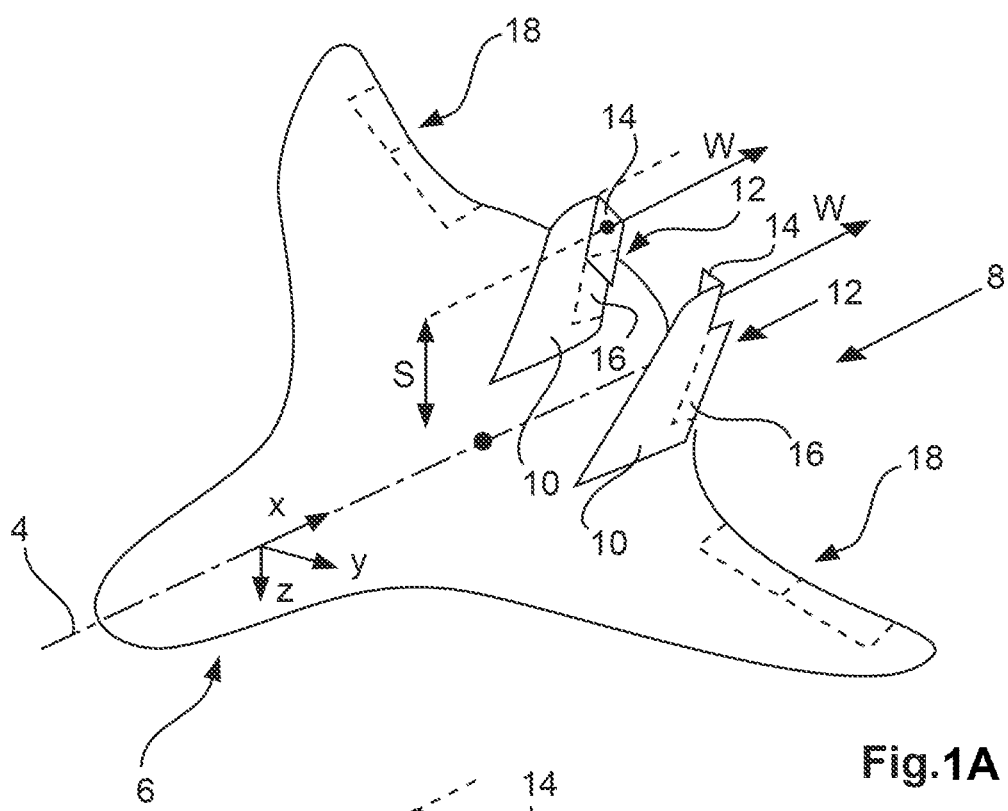
FIGS. 1A and 1B show a first exemplary embodiment of the aircraft according to the invention.

FIG. 1A shows an aircraft 2 with blended-wing-body configuration, the shape of which is based on a central fuselage body that does not comprise horizontal stabilizers and airfoils. The aircraft has a longitudinal axis 4. The aircraft also has a front side 6 and a rear side 8. Two vertical stabilizers 10 are arranged in an exemplary fashion in the region of the rear side 8 and mirror-symmetrically spaced apart from the longitudinal axis 4 of the aircraft.

The vertical stabilizers 10 feature rudders 12 that are respectively divided in the form of, for example, two rudder segments 14 and 16, and the rudder segments are arranged on top of one another.

Exemplary high-lift control surfaces 18 drawn with broken lines are furthermore arranged in the region of the rear side 8. These high-lift control surfaces significantly increase the lift of the aircraft 2 in the extended state such that it is possible to reduce the speed during an approach or to shorten the take-off distance. In the blended-wing-body configuration shown, however, the deflection of these high-lift control surfaces 18 also generates a negative pitching moment that, according to the invention, is compensated by deflecting compensation control surfaces, for example, in the form of the upper rudder segments 14. For this purpose, the aircraft 2 according to an embodiment of the invention is designed for deflecting the upper rudder segments 14 opposite to one another such that an additional drag W is respectively generated on the rudder segments 14 due to the flow against these segments. This additional drag results in a positive pitching moment due to the lever arm s that corresponds to the section along the vertical axis z of the aircraft between the center of gravity CG of the aircraft 2 and the aerodynamic center of the upper rudder segments 14. In other words, this means that a nose-heavy moment is generated by means of high-lift control surfaces 18 and may be at least partially compensated with a tail-heavy moment realized by means of compensation control surfaces. The compensation control surfaces may also be realized in the form of control surfaces other than rudder segments 14. It would, however, be conceivable to furnish an already existing aircraft 2 with segmented rudders 12 in the example shown by modifying a flight control unit such that the central idea of the invention is realized.

Due to the clear spatial separation of the high-lift control surfaces 18 and the compensation control surfaces, the generation of the high lift is not influenced. The aerodynamic quality and the lift required for the approach thusly may be simultaneously preserved while the glide slope may be adjusted to the conventional 3° or other, steeper angles of approach that are usually realized by aircraft with a conventional configuration that features an elongated fuselage and a separate horizontal stabilizer.

Figure 1B:
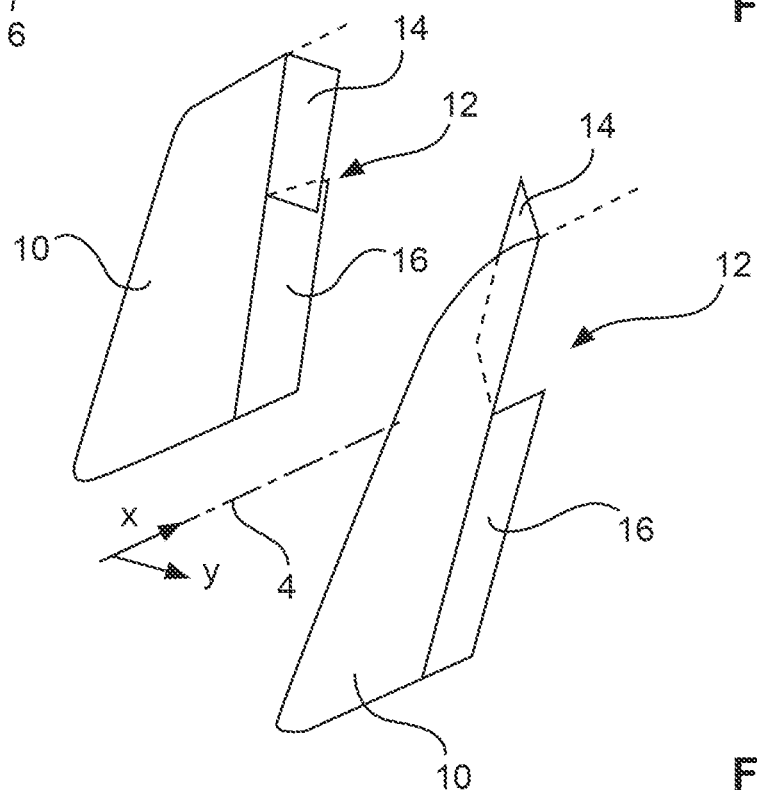

The opposite movement of the upper rudder segments 14 illustrated in FIG. 1A and FIG. 1B is directed, for example, inward in the direction of the longitudinal axis 4 of the aircraft. Naturally, the same effect may also be achieved if the upper rudder segments 14 are moved outward, i.e., away from the longitudinal axis 4 of the aircraft.

Figure 2A:
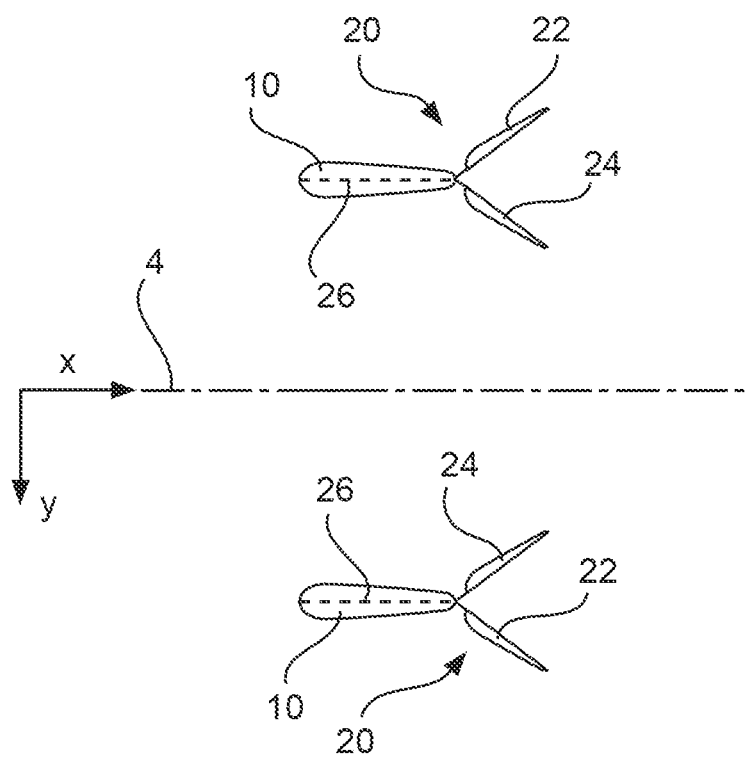
FIGS. 2A and 2B show a modification of vertical stabilizers of an aircraft according to an embodiment of the invention.
Figure 2B:
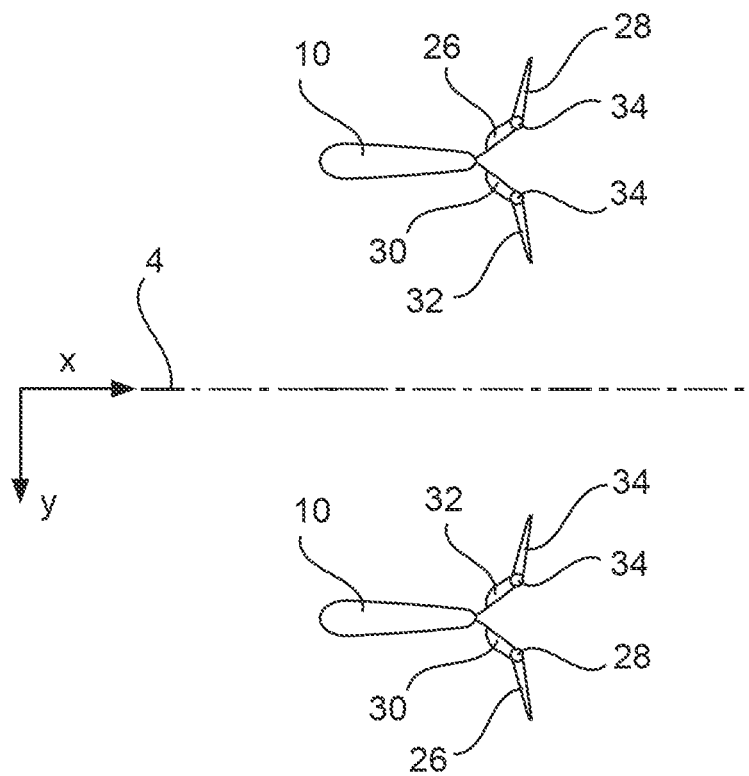

FIG. 2A and FIG. 2B also show vertical stabilizers 10 that are arranged such that they are mirror-symmetrically spaced apart from a longitudinal axis 4 of the aircraft. The peculiarity of this embodiment, however, may be seen in that rudders 20 are divided into two rudder halves 22 and 24 in a plane that is arranged parallel to a chord 26 of the vertical stabilizer 10 in the neutral position of the rudders 20. The rudder halves 22 and 24 may be used as compensation control surfaces. The surface for generating a drag W may be doubled relative to conventional rudders without such a division by spreading apart the rudder halves 22 and 24. This in turn means that it would be possible to realize the rudder halves 22 and 24 much smaller in the vertical direction than the individual rudder segments 14 according to FIG. 1B in order to generate a certain compensation moment. The aerodynamic center of the rudder halves 22 and 24 or sections, on which the respective drag W is applied, thusly may also lie higher than that of the rudder segments 14 such that the effective lever arm s for generating a positive pitching moment may be increased. The required height of the rudder halves 22 and 24 for generating the necessary compensation moment could be less than half the height of the rudder segments 14 due to the increased lever arm.

FIG. 2B shows a division into two respective rudder sections 26 and 28 or 30 and 32 that are connected to one another by means of a hinge. This division may lead to an improved extent into the flow against the aircraft such that the generation of a positive pitching moment may be additionally improved.

Figure 3:
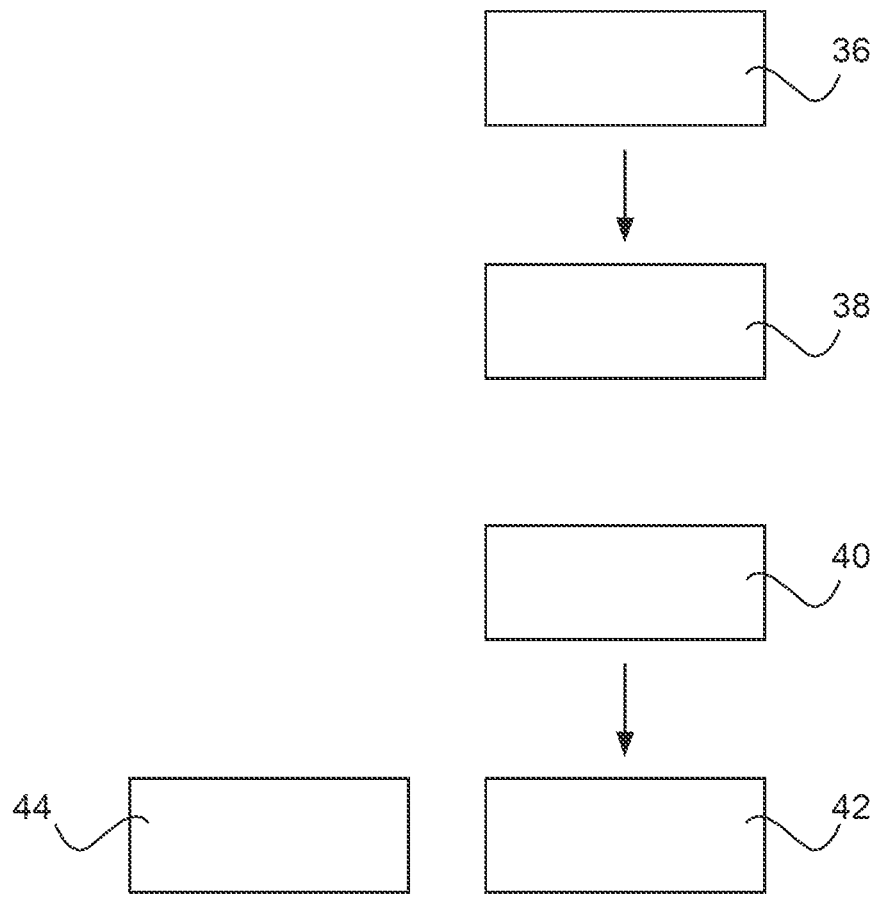
FIG. 3 shows a method according to an embodiment of the invention in the form of a schematic block diagram.

FIG. 3 finally shows the main steps of the method according to an embodiment of the invention. At least one compensation control surface for generating a positive pitching moment is deflected 38 simultaneously with the deflection 36 of high-lift control surfaces. This may be realized by deflecting 40 a first control surface in a first direction and deflecting 42 a second control surface in a second direction. The first direction and the second direction extend opposite to one another. The same effect may also be achieved with a division 44 of a rudder segment.

At this point, it should be explicitly noted that all features illustrated in FIG. 1A to FIG. 3 may also be combined with one another. It would be conceivable, for example, that an aircraft only features a single vertical stabilizer and a positive pitching moment that does not lead to the generation of a yaw moment may be generated by means of a corresponding segmentation. However, an aircraft may also feature two vertical stabilizers with segmented rudders. The individual segments of these rudders could be deflected opposite to one another in order to individually generate a respective positive pitching moment, but no yaw moment at large acts upon the aircraft. It would also be conceivable to realize only an upper segment of a single rudder of a single vertical stabilizer in the form of a split rudder.

As a supplement, it should be noted that "featuring" does not exclude any other elements or steps, and that "a" or "an" does not exclude a plurality. It should furthermore be noted that features that were described with reference to one of the above exemplary embodiments may also be used in combination with other features of other above-described exemplary embodiments. Moreover, while at least one exemplary embodiment has been presented in the foregoing summary and detailed description of the invention, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment of the invention, it being understood that various changes may be made in the function and arrangement of elements described in an exemplary embodiment without departing from the scope as set forth in the appended claims and their legal equivalents.

What is claimed is:

1. An aircraft, comprising:
   a central fuselage body without horizontal stabilizer;
   at least one high-lift control surface;
   at least one vertical stabilizer arranged on the central fuselage body;
   at least one movable compensation control surface; and
   a control unit connected to the at least one movable compensation control surface and the at least one high-lift control surface;
   wherein the at least one movable compensation control surface is movable independently of the at least one high-lift control surface of the aircraft and generates a positive tail-heavy pitching moment when moved into a flow against the aircraft, and the control unit is adapted for moving the at least one high-lift control surface and the at least one movable compensation control surface.

2. The aircraft of claim 1, wherein the at least one movable compensation control surface is arranged on an upper side of the at least one vertical stabilizer.

3. The aircraft of claim 1, wherein the at least one movable compensation control surface is movable symmetrically referred to a longitudinal axis of the aircraft in order to prevent an additional yaw moment.

4. The aircraft of claim 1, furthermore comprising a second compensation control surface, wherein the at least one movable compensation control surface and the second compensation control surface are arranged mirror-symmetrical referred to a longitudinal axis of the aircraft and are movable opposite to one another.

5. The aircraft of claim 1, wherein the at least one vertical stabilizer comprises a segmented rudder and the at least one movable compensation control surface is realized in a form of at least one rudder segment.

6. The aircraft of claim 5, comprising a second vertical stabilizer, wherein the at least one vertical stabilizer and the second vertical stabilizer are arranged mirror-symmetrical referred to a longitudinal axis of the aircraft and respectively provided with a segmented rudder, wherein at least one rudder segment respectively forms a compensation control surface.

7. The aircraft of claim 5, wherein the segmented rudder is a split rudder.

8. The aircraft of claim 5, wherein the segmented rudder is a double-hinge split rudder.

9. A method for compensating a negative pitching moment of an aircraft with a central fuselage body without a horizontal stabilizer, with at least one high-lift control surface, with at least one vertical stabilizer that is arranged on the central fuselage body, at least one movable compensation control surface and a control unit connected to the at least one movable compensation control surface and the at least one high-lift control surface, the method comprising:
   moving the at least one high-lift control surface with the control unit in order to generate a high lift; and
   moving the at least one movable compensation control surface with the control unit into a flow against the aircraft in order to generate a positive pitching moment.

10. The method of claim 9, wherein the moving the at least one movable compensation control surface comprises moving in a respective opposite movement of an at least one rudder segment on two vertical stabilizers that are arranged mirror-symmetrical referred to a longitudinal axis of the aircraft.

11. An apparatus, comprising: at least one high-lift control surface;
   at least one compensation control surface adapted to deflect into an aerodynamic flow against an aircraft in order to generate a positive pitching moment; and
   a control unit connected to the at least one compensation control surface and the at least one high-lift control surface, the control unit adapted to:
   move the at least one high-lift control surface in order to generate a high lift; and
   move the at least one compensation control surface to deflect into the aerodynamic flow against the aircraft in order to generate the positive pitching moment.

12. The apparatus of claim 11, wherein the at least one compensation control surface is arranged on an upper side of an at least one vertical stabilizer.

13. The apparatus of claim 11, wherein the at least one compensation control surface is movable symmetrically referred to a longitudinal axis of the aircraft in order to prevent an additional yaw moment.

14. The apparatus of claim 11, furthermore comprising a second compensation control surface, wherein the at least one compensation control surface and the second compensation control surface are arranged mirror-symmetrical referred to a longitudinal axis of the aircraft and the control unit is adapted to move the at least one compensation control surface and the second compensation control surface opposite to one another.

15. The apparatus of claim 12, wherein the at least one vertical stabilizer comprises a segmented rudder and the at least one compensation control surface is realized in a form of at least one rudder segment.

16. The apparatus of claim 15, comprising a second vertical stabilizer, wherein the at least one vertical stabilizer and the second vertical stabilizer are arranged mirror-symmetrical referred to a longitudinal axis of the aircraft and respectively provided with a segmented rudder, wherein at least one rudder segment respectively forms a compensation control surface.

17. The apparatus of claim 15, wherein the segmented rudder is a split rudder.

18. The apparatus of claim 15, wherein the segmented rudder is a double-hinge split rudder.

* * * * *